No. 800,097. PATENTED SEPT. 19, 1905.
D. GENESE.
CHEMICAL APPARATUS.
APPLICATION FILED DEC. 23, 1904.
2 SHEETS—SHEET 1.
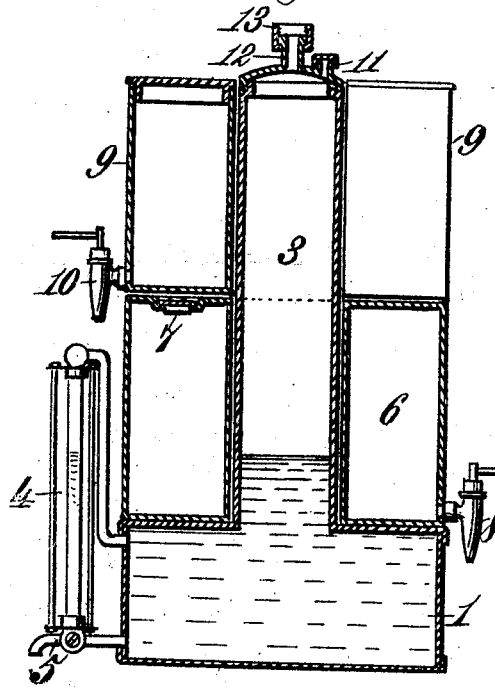
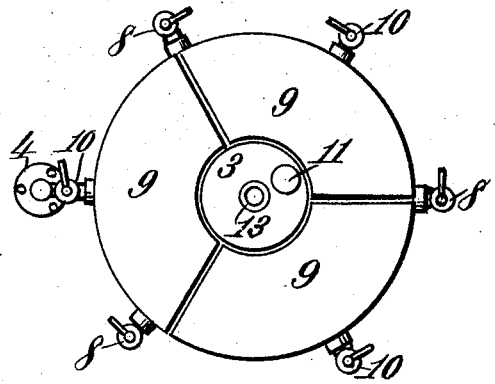
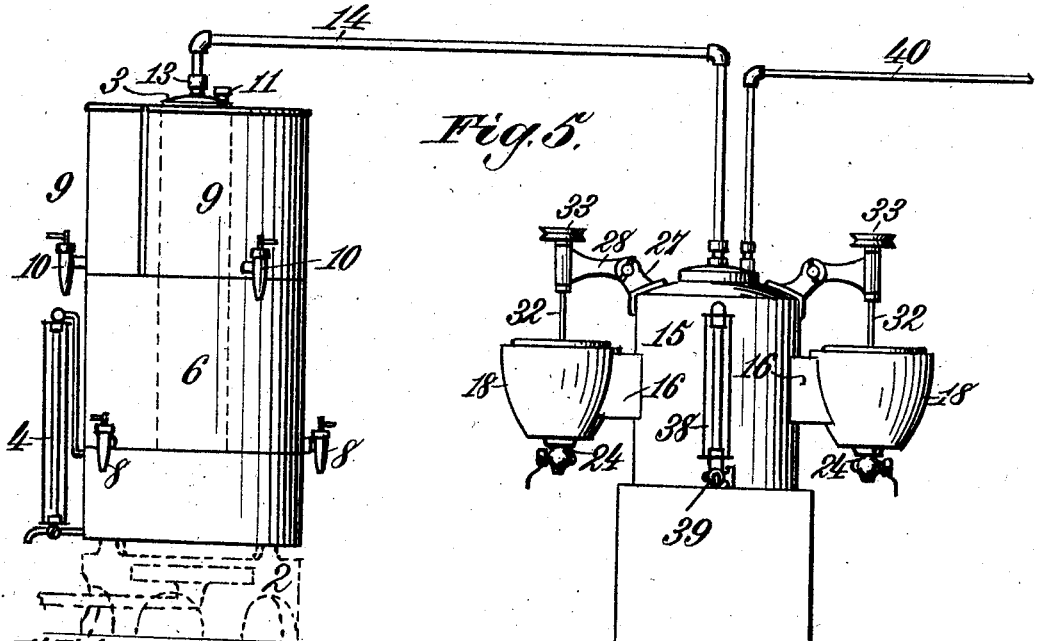
Witnesses
Robert Everett
C. D. Kesler
Inventor
David Genese.
By James L. Norris
Atty.

No. 800,097. PATENTED SEPT. 19, 1905.
D. GENESE.
CHEMICAL APPARATUS.
APPLICATION FILED DEC. 23, 1904.

2 SHEETS—SHEET 2.

Witnesses.

Inventor,
David Genese.
By James L. Norris.
Atty.

UNITED STATES PATENT OFFICE.

DAVID GENESE, OF BALTIMORE, MARYLAND, ASSIGNOR, BY MESNE ASSIGNMENTS, TO GENESE CEREAL MANUFACTURING CO., OF BALTIMORE, MARYLAND, A CORPORATION OF WEST VIRGINIA.

CHEMICAL APPARATUS.

No. 800,097.       Specification of Letters Patent.       Patented Sept. 19, 1905.

Application filed December 23, 1904. Serial No. 238,154.

*To all whom it may concern:*

Be it known that I, DAVID GENESE, a citizen of the United States, residing at Baltimore, in the State of Maryland, have invented new and useful Improvements in Chemical Apparatus, of which the following is a specification.

My invention relates to certain new and useful improvements in chemical apparatus, and has for one of its objects to provide a device for use in reducing chemical substances to a fluid state, and especially such chemical substances or mixtures of chemical substances which require a certain degree of heat to cause such reduction, but which cannot be maintained at such degree of heat for any considerable length of time without decomposing or evaporating, and yet must be kept above a certain temperature lower than that necessary to cause fluidity in order that the fluid condition may be preserved for a desired length of time.

A further object of the invention is to provide a novel device by means of which such chemical substance or substances are kept in a fluid state and while still maintained at such lower temperature may have admixed therewith other substances and the mixture be at once drawn off in a rapid, cleanly, and convenient manner for such application as may be required.

While the invention is intended for such general purposes as indicated, the apparatus herein described is more especially intended for use in solidifying mentho-glycerin, glyco-thymolin, or similar compounds containing such ingredients as menthol, thymol, oil of eucalyptus, and alcohol, all of which ingredients are highly volatile, besides resinous substances which will coagulate if overheated and evaporate if the heat necessary to produce the fluid condition referred to is maintained too long.

A still further object of the invention is to provide for agitating the mass during and after admixture of substances forming the compound and just before the mass is drawn off and permitted to solidify, which operation prevents deposit of any of the ingredients while maintained in a heated condition, but at a relatively low temperature.

In order that the invention may be clearly understood, I have illustrated the same in the accompanying drawings, in which—

Figure 3:
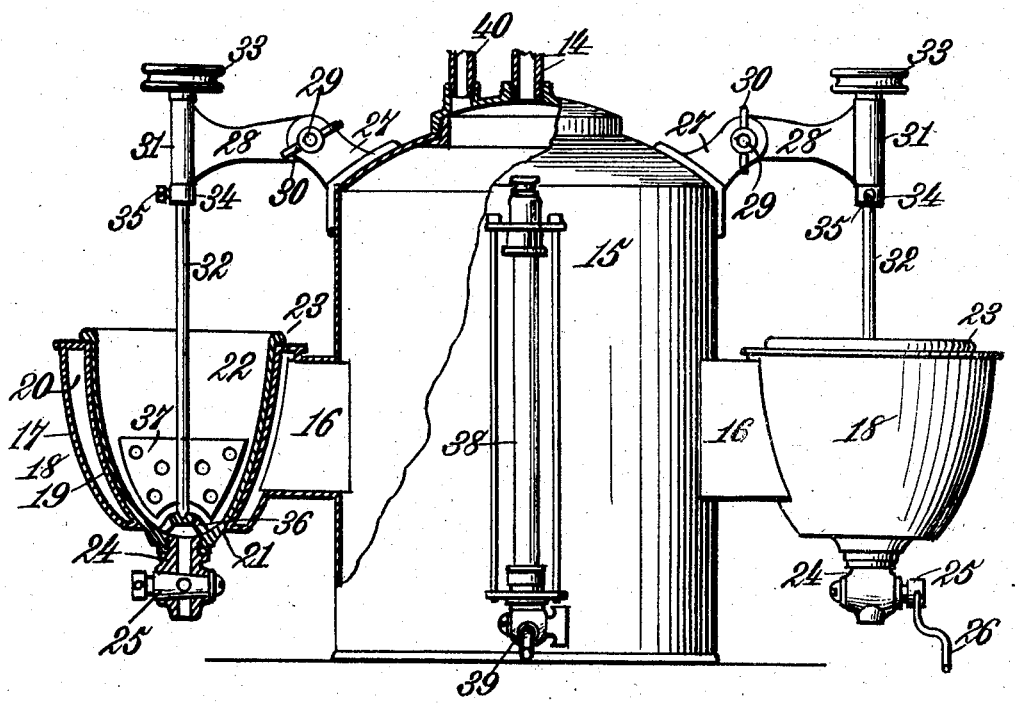
Figure 4:
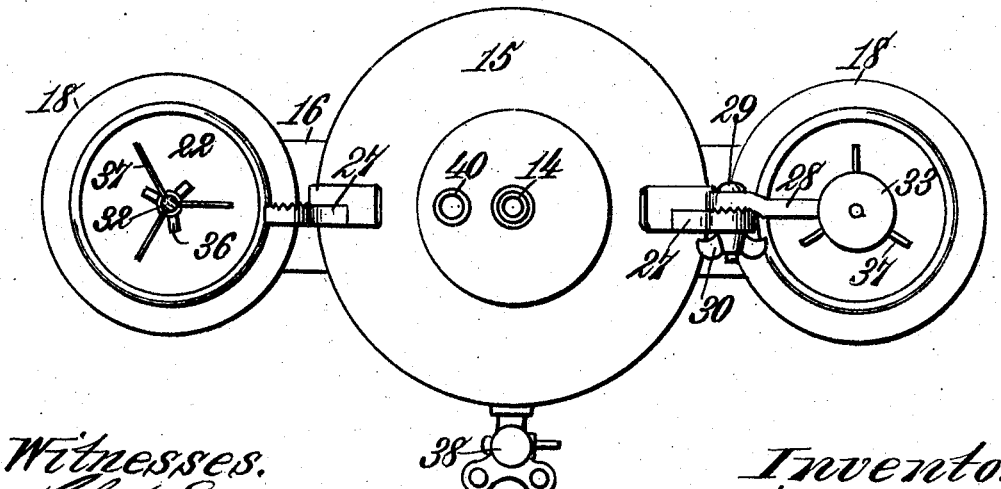

Figure 1 is a sectional elevation of the main heating device. Fig. 2 is a top plan view of the same. Fig. 3 is a view, partly in elevation and partly in section, of the secondary heating device, herein referred to for convenience as the "mixing" device. Fig. 4 is a top plan view, partly in section, of the mixing device; and Fig. 5 is a view showing the devices illustrated in Figs. 1 and 3 connected to form the complete apparatus.

I will first describe the main heating device with reference to Figs. 1, 2, and 5.

1 indicates a boiler, which is designed to be placed upon any suitable heating device, such as illustrated by 2, and is provided with a steam-dome 3 of considerably less diameter than the boiler proper and rising vertically from the central portion of the upper side thereof. The boiler 1 is provided with a water-gage 4 and draw-off cock 5. Supported upon the boiler 1 and surrounding the steam-dome 3 is an annular chamber 6, which is about half the height of the steam-dome 3 and is provided in its upper side with a closable filling-orifice 7. The chamber 6 is provided toward its lower end with draw-off cocks 8, preferably three in number, arranged at equal distances apart around the circumference of the said chamber, by means of which the substance contained in such chamber may be drawn off when required. Supported upon the annular chamber 6 and arranged to encircle the steam-dome 3 are three segmental chambers 9, each of which is provided with a draw-off cock 10 toward its lower end. The steam-dome 3 is provided in its upper end with a closable filling-orifice 11, by means of which water may be supplied to the boiler 1, and with a central outlet-pipe 12, on which is mounted a screw-threaded thimble 13, by means of which a pipe 14 may be connected to and communicate with said steam-dome. The pipe 14 is connected at its other end to and communicates with a steam-chamber 15, forming a part of the mixing device, before referred to and illustrated in detail in Fig. 3.

Projecting from opposite sides of the chamber 15 and located about centrally thereof are two short steam-ducts 16, each of which is secured to the outer wall 17 of a steam-jacket 18, the inner wall of which is indicated by 19. It will be understood that the ducts 16 communicate, through the outer wall 17, with the space 20 between the two walls 17 and 19. The jackets 18 are cup-shaped and are open at their top and bottom, the bottom opening 21 being, however, much smaller than the opening in the top. Supported in each of the steam-jackets 18 is a cup 22, having an upper flanged edge 23, which is adapted to rest upon the top of the steam-jacket. Secured in the lower end of each of the cups 22 is a short outlet pipe or tap 24, having a valve 25, the lower portion of the cup and said tap, with its valve, extending through the opening 21 in the lower end of the steam-jacket. Preferably I employ a removable handle 26 for turning the valve 25, so as not to interfere with the removal of the cups from the steam-jackets. The cups 22 are designed to nest snugly within the steam-jacket, and as the steam from the steam-chamber 15 can circulate freely in the space 20 surrounding said cups it will be obvious that the contents thereof can be heated, while at the same time the steam will not be brought into contact with the ingredients of the cups. Mounted on opposite sides of the steam-chamber and at the upper end thereof are two brackets 27, each of which has preferably one of its faces serrated.

28 indicates an arm having one of its sides serrated at one end portion, and the bracket 27 and the said serrated end portion of said arm are apertured to receive a bolt 29, on which is mounted a clamping-nut 30, by means of which the arm 28 may be firmly secured to the bracket 27. It will be understood that the arm 28 is in a similar manner secured to each of the brackets 27. Formed on the outer end of each of the arms 28 is an elongated bearing 31, through which passes a shaft 32, having on its upper end a pulley 33, said shaft being prevented from rising by means of a collar 34 bearing against the under edge of the bearing 31 and clamped to the shaft by means of a screw 35. The lower end of each shaft 32 is supported in a spider bearing 36, and mounted on the lower end portion of each shaft are a series of agitator-blades 37. By means of bands applied in the ordinary way to the pulleys 33 it will be seen that the shafts 32, with their agitator-blades 37, may revolve, so that the mixture in the cups 22 may be thoroughly stirred or agitated. The steam-chamber 15 is provided with a gage 38 to indicate the height of the water condensation therein, said gage having a draw-off cock 39. From the top of the steam-chamber 15 leads an escape-pipe 40.

It will be seen that the pipe 14, connecting the heating device and the mixing device, is for the purpose of conducting steam from the steam-dome 3 to the interior of the steam-chamber 15 for the purpose of supplying steam, and consequently heat, to the jackets 18. In the use of the apparatus I first place in the annular chamber 6 the materials to be liquefied, which in the example named would be stearic acid, glycerin, and carbonate of soda, and subject this mixture to a temperature of about 220° Fahrenheit for from three to five hours, the compounds indicated forming the solidifying base of the solid ultimately to be produced. The liquid, having about the consistency of wine, may be at once drawn off from the cocks 8, and if for any reason the liquid produced cannot be at once utilized it may be drawn off into the chambers 9, which have removable tops 41 for this purpose, which chambers will maintain liquid at the temperature of about 150°, which is a sufficient degree of heat to preserve the fluid condition, and yet not great enough to produce decomposition. It will be understood, however, that the chambers 9 are only for convenience in case the operator is not ready to at once use the stearate of glycerin as soon as it is drawn from the chamber 6. The stearate of glycerin is next poured into the cups 22, which are maintained by the steam-jackets at a temperature of about 125° Fahrenheit, and the glyco-thymolin or mentho-glycerin are then added thereto. The mixture is thoroughly agitated by the blades 37, and as soon as the ingredients are thoroughly admixed the resultant compound is drawn off through the tap 24 into suitable molds and allowed to solidify. The temperature of the cups 22 is sufficient to convert the mixture into low-fusing fluid, but will not cause any of the essential-oils to be evaporated. Rapidity of operation is necessary, as the mixture described solidifies very quickly, and hence the taps provided in the bottom of the cups 22 afford a most convenient means for readily withdrawing the compound. There is therefore no interval of delay in the operaton such as would be necessitated by removing the cups from the steam-jackets and pouring the contents out of the same. Furthermore, the provision of the taps in the bottom of the cups assures absolute cleanliness in the operation. To remove the cups for the purpose of cleansing the same at the completion of the operation, the screw 35 is loosened and the shaft 32 raised to carry the agitator 37 out of the cups. Then the clamping-nut 30 is loosened and the arm 28 turned upward, carrying the shaft and agitator out of the way, when the cup can be readily removed.

Having thus fully described my invention, what I claim as new is—

1. In an apparatus of the class described, in combination with a steam-chamber, a boiler having a steam-dome, a pipe connecting said steam-dome with said steam-chamber, a steam-jacket communicating with said steam-chamber, and a cup supported in said steam-jacket.

2. In an apparatus of the class described, in combination with a steam-chamber, a boiler having a steam-dome, a pipe connecting said steam-dome with said steam-chamber, a steam-jacket communicating with said steam-chamber, a cup supported in said steam-jacket, and a valved tap connected to the bottom of said cup and projecting through said jacket.

3. In an apparatus of the class described, in combination with a steam-chamber, a boiler having a steam-dome, a pipe connecting said steam-dome with said steam-chamber, a steam-jacket communicating with said steam-chamber, a cup supported in said steam-jacket, and an agitator extending into said cup.

4. In an apparatus of the class described, in combination with a boiler having a steam-dome, an annular chamber mounted on said boiler and surrounding said steam-dome and having a closable inlet and outlet, a steam-chamber, a pipe connecting said steam-dome with said steam-chamber, a steam-jacket communicating with said steam-chamber, and a cup supported in said steam-jacket and having a valved tap projecting through the lower end thereof.

5. In an apparatus of the class described, the combination with a steam-chamber and means for supplying steam thereto, a steam-jacket communicating with said chamber, a cup supported in said steam-jacket, a bearing pivotally supported from said steam-chamber, a rotatable shaft mounted in said bearing and carrying agitators located within said cup, and means for detachably securing said shaft in position in said bearing, the combination operating as described.

6. In an apparatus of the class described, in combination with a steam-chamber and means for supplying steam thereto, a steam-jacket supported from and communicating with said steam-chamber and having an open lower end, and a cup removably supported in said steam-jacket and having a closable outlet in its lower end.

In testimony whereof I have hereunto set my hand in presence of two subscribing witnesses.

DAVID GENESE.

Witnesses:
N. L. BOGAN,
F. B. KEEFER